US012662364B2

(12) United States Patent
Bø et al.

(10) Patent No.: US 12,662,364 B2
(45) Date of Patent: Jun. 23, 2026

(54) LIQUID LOADING ASSEMBLY FOR FILLING A SHIP-HOLD OR TANK

(71) Applicant: GBA Marine AS, Kolbjørnsvik (NO)

(72) Inventors: Rune Bø, Arendal (NO); Helge K. Aasen, Kolbjørnsvik (NO)

(73) Assignee: GBA Marine AS, Kolbjørnsvik (NO)

(*) Notice: Subject to any disclaimer, the term of this patent is extended or adjusted under 35 U.S.C. 154(b) by 0 days.

(21) Appl. No.: 18/701,879

(22) PCT Filed: Oct. 25, 2022

(86) PCT No.: PCT/NO2022/050241

§ 371 (c)(1),
(2) Date: Apr. 16, 2024

(87) PCT Pub. No.: WO2023/075605

PCT Pub. Date: May 4, 2023

(65) Prior Publication Data

US 2024/0417238 A1 Dec. 19, 2024

(30) Foreign Application Priority Data

Oct. 26, 2021 (NO) .................................... 20211279

(51) Int. Cl.
*B67D 7/04* (2010.01)
*B63B 17/00* (2006.01)
(Continued)

(52) U.S. Cl.
CPC ................ *B67D 7/04* (2013.01); *B63B 25/12* (2013.01); *B63B 27/25* (2013.01)

(58) Field of Classification Search
CPC ........ B67D 7/048; B67D 7/0478; B67D 9/00; B63B 17/0027
See application file for complete search history.

(56) References Cited

U.S. PATENT DOCUMENTS 7,096,689 B2 8/2006 Lothe
7,228,871 B2 6/2007 Lothe
(Continued)

FOREIGN PATENT DOCUMENTS

EP 1463683 A1 10/2004
KR 20120100579 A 9/2012
(Continued)

OTHER PUBLICATIONS

Norwegian Search Report for Patent Application No. 20211279 filed Oct. 26, 2021, Date of report: May 23, 2022, 3 pgs.
(Continued)

*Primary Examiner* — Paul J Gray
(74) *Attorney, Agent, or Firm* — Alix, Yale & Ristas, LLP

(57) ABSTRACT

A liquid loading assembly for filling a ship-hold or tank with a volatile liquid, includes an oil supply conduit, fluidly connected to the tank, the outlet end of said conduit extending vertically within a dropline. The dropline extends from a lower dropline end positioned below the outlet end of the oil supply conduit to an upper dropline end positioned above the outlet end of the oil supply conduit, the lower dropline end being at least partially closed by a valve. The valve is arranged to open gradually up to a maximum aperture in response to one of i) increased pressure on the valve and ii) a level of liquid above the valve.

15 Claims, 5 Drawing Sheets

(51) Int. Cl.
*B63B 25/12* (2006.01)
*B63B 27/25* (2006.01)

(56) References Cited

U.S. PATENT DOCUMENTS

| | | | |
|---|---|---|---|
| 7,526,923 | B2 | 5/2009 | Lothe |
| 7,597,115 | B2 | 10/2009 | Lothe |
| 2011/0108129 | A1 | 5/2011 | Lee et al. |

FOREIGN PATENT DOCUMENTS

| | | | |
|---|---|---|---|
| KR | 20120139385 | A | 12/2012 |
| KR | 101228065 | B1 | 1/2013 |
| KR | 20130017827 | A | 2/2013 |
| KR | 101281179 | B1 | 7/2013 |
| WO | 03048028 | A1 | 6/2003 |
| WO | 2011112095 | A1 | 9/2011 |

OTHER PUBLICATIONS

International Search Report and Written Opinion mailed Feb. 10, 2023 for International Patent Application No. PCT/NO2022/050241.

LIQUID LOADING ASSEMBLY FOR FILLING A SHIP-HOLD OR TANK

BACKGROUND

The present disclosure concerns an assembly for loading oil to tank ships in a manner which reduces emittance of oil vapour due to flashing in the cargo transfer pipe system.

Flashing of light end hydrocarbon components from oil during transfer of cargo is a significant contributor to emission of Volatile Organic Compounds (VOC) from tank ships, and typically occur in the cargo transfer piping system upstream of vertical drops, and downstream of nozzles or other disturbances in the flow. During cargo transfer operations, oil flow through pumps, pipe bends, valves, metering skids and piping with variable elevations. All these obstacles contribute to release gas (VOC) from the oil. Some of the gas will be re-absorbed in the oil, and some is carried along in the cargo transfer system as bubbles in a two-phase flow.

Gas bubbles from the two-phase flow will eventually rise to the surface and be released as VOC to the tank atmosphere. On their way to the surface, these gas bubbles will cause a stripping effect that leads to further VOC release from the oil. On reaching the surface, the gas bubbles will cause vigorous agitation of the interface between oil and tank atmosphere, contributing to even further increase of VOC released from the oil.

A significant part of this hydrocarbon vapour is generated by flashing at the top of a conventional drop line, a vertical oil supply conduit used to transfer oil from deck level to the bottom of the cargo tanks directly, or to connect cargo transfer lines at deck level with a distribution system in the bottom of the tank ship leading oil to individual cargo tanks. Typical height of such droplines are 20-30 meters.

Oil in the vertical part of the oil supply conduit is accelerated by gravity, which causes a siphon effect that leads to an undesired pressure reduction in the upper part of the conduit. This behaviour is due to natural properties of flowing fluids according to known principles of fluid dynamics, e.g., Bernoulli's equation. The general problem related thereto being excessive emissions of VOC due to the reduced pressure.

EP 1 463 683 B1 (NO U.S. Pat. No. 315,417) teaches a method for reducing evaporation of VOCs during loading of liquid petroleum products to cargo tanks or storage tanks. The core of this method is the use of a feed pipe that ends in a loading column having a significantly larger cross-section than that of the feed pipe.

Among other publications in this technical area, EP 1 576 313 B1, EP 1 373 062 B1, as well as EP 1 509 721 A1 could be mentioned.

SUMMARY

The disclosure provides a system, device, method, or assembly that will significantly reduce VOC evaporation from oil when loading a tank ship.

The disclosed liquid loading assembly uses a flow control valve on the outlet to increase liquid level inside a vertical dropline surrounding the oil supply conduit. This dropline extends from top of the cargo tank, and almost to the bottom. The increased liquid level significantly reduces drop height of the oil supply conduit, thus significantly reducing the siphon effect and emission of VOC from the oil.

Disclosed herein is an assembly that also reduces bubble formation and splashing due to the fact that the dropline is filled to and above the level of the free end of the oil supply conduit in a very short period of time, and due to position and function of the flow control valve combined with outlet piping design at the lower end of the drop line.

In addition, from the point in time when the supply conduit becomes submerged in oil, vapour released at the top of the vertical oil supply conduit will have to overcome hydrostatic pressure in the conduit outlet in order to pass through. As more vapour is released from the oil flow, gas pressure inside the oil supply conduit is expected to increase, and thereby reduce the typical low-pressure area in the upper part of the oil supply conduit even further.

By proximate as used herein is understood (a distance) typically less than 2 meters, more preferred less than 1 meter and more preferably less than 0.5 meter.

By combining the disclosed embodiments of a liquid loading assembly with a gas/liquid separation device (commercially available technology, and not part of the invention), a large portion of gas bubbles generated in the oil supply conduit before the dropline, including parts of the oil supply conduit outside the oil tanker, typically from an oil terminal, floating storage vessel or production platform, may also be removed from the oil in the supply conduit to further reduce this source of VOC emissions.

In the following, disclosed embodiments of a liquid loading assembly are described in further detail in the form of non-limiting exemplary embodiments illustrated by drawings, where:

DETAILED DESCRIPTION

Figure 1:
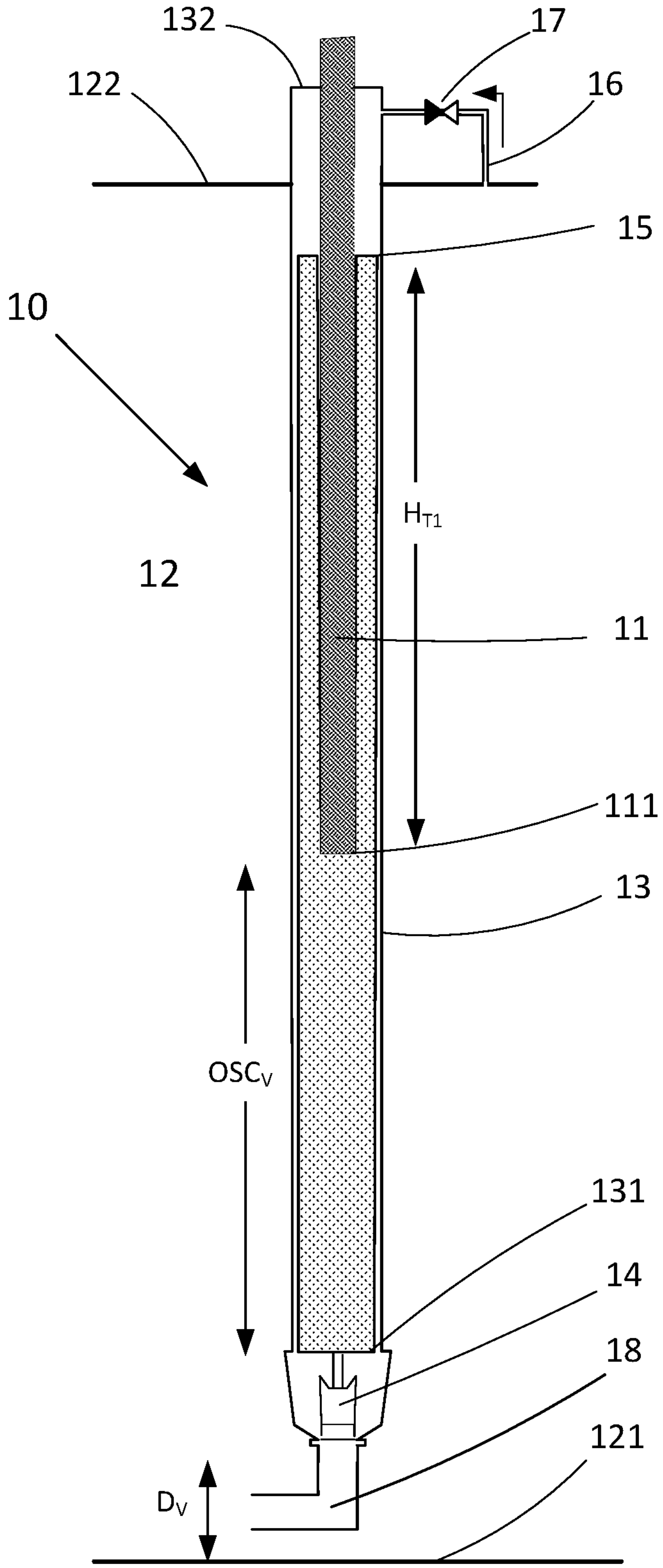
FIG. 1 is a side sectional view of an embodiment of a dropline according to the present disclosure with a first fluid.

FIG. 1 is a side sectional view of an embodiment of the liquid loading assembly according to the present disclosure. An oil filling assembly 10 mainly comprising the lower part of an oil supply conduit 11 with an outlet end 111 surrounded by a dropline 13, the latter being terminated by a valve 14, the function of which being described below. The device is arranged within an oil tank 12 having a bottom wall 121 and a top wall 122.

One challenge with the disclosed liquid loading assembly is to adjust the flow through valve 14. A typical arrangement would be to use an actuated valve together with a control system and a sensor-based level monitoring of the dropline 13. This can also be solved mechanically with a valve opened by liquid pressure acting on a pressure spring assisted closure member, which is the preferred valve design according to aspects of the present disclosure.

When the valve 14 involves a pressure spring, the spring is designed to hold the closure member in a closed position when the dropline is empty, but unable to hold the closure member in a closed position when the dropline is filled with a volatile fluid of density typically higher than 0.6 kg/l to a level above the outlet end 111 of the oil supply conduit 11.

As shown by FIG. 1, the liquid level 15 within the dropline is quite high, extending to a height $H_{T1}$ above the outlet end 111 of the oil supply conduit 11, indicating that the density of the liquid is relatively low, and that a substantial height of liquid is required for the valve 14 to fully open.

As also shown in FIG. 1, the oil supply conduit 11 extends only to a position 111, a significant distance OSCv, at least 4 meters, and preferably 6-8 meters, above the bottom end of the dropline to limit disturbances around the outlet valve 14 caused by the incoming oil flow.

Figure 5:
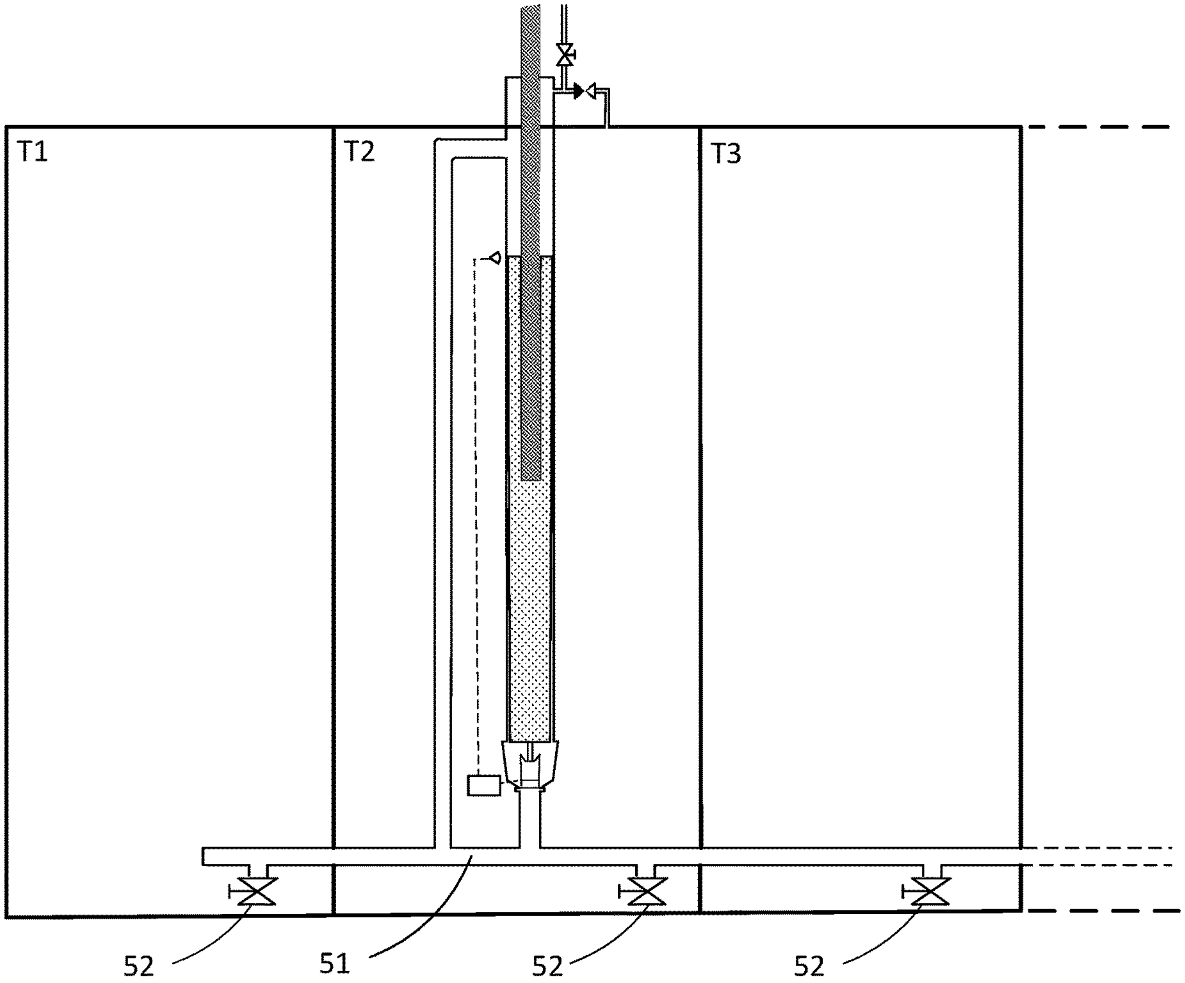
FIG. 5 is a side sectional view illustrating a series of tanks arranged with a dropline according to the present disclosure combined with a cargo distribution system to fill individual cargo tanks.

To avoid local pressure reduction or siphon effect in the dropline outlet, the outlet of valve 14 is positioned just a modest distance $D_v$, typically 1-2 meters, and not more than 3 meters, above the bottom wall 121 of the tank. A non-mandatory conduit 18 is shown connected to the outlet end of the valve 14. Depending on vessel configuration, the conduit 18 is either routed to a common cargo distribution system as shown in FIG. 5, or used directly as a horizontal outlet with vertical distance 0.25 to 0.5 meters above the tank bottom, to thereby reduce splashing of the oil being loaded into the tank 12.

As a precaution, the valve 14 is typically provided with a closure member arranged to ensure a limited open fluid passage even in the position designated as closed.

As previously indicated, it is an option or alternative within the general aspects of the present disclosure to control the opening of the valve terminating the dropline 13 by other means than the liquid pressure acting thereon, such as by a level sensor that continuously monitors the liquid level with the dropline 13 and in combination with a control system causes the valve to gradually open more as the liquid level within the dropline 13 rises and vice versa. In that manner, the sensor-based system strives to hold the liquid level near constant, as with the case of the pressure determined valve. The advantage of a sensor-based system is that the liquid level is independent of the density of the liquid, while a disadvantage is that it is more complicated and that there will be a higher risk for failure in the sensor itself or in its connection to the control system and the valve.

The dropline 13 extends above the top 122 of the tank 12 to a top end 132 thereof. Near the top end 132 of the dropline 13, an assembly comprising a pipe 16 and a check valve 17 is arranged to allow vapour from top of the tank 12 to enter the dropline 13. The check valve 17 ensures that vapour cannot pass in the opposite direction. This will ensure that gas pressure inside the dropline 13 above liquid level 15 is always higher or equal to gas pressure in the surrounding tank 12, and is typically useful to avoid under pressure during gravity drain of the dropline 13.

Figure 2:
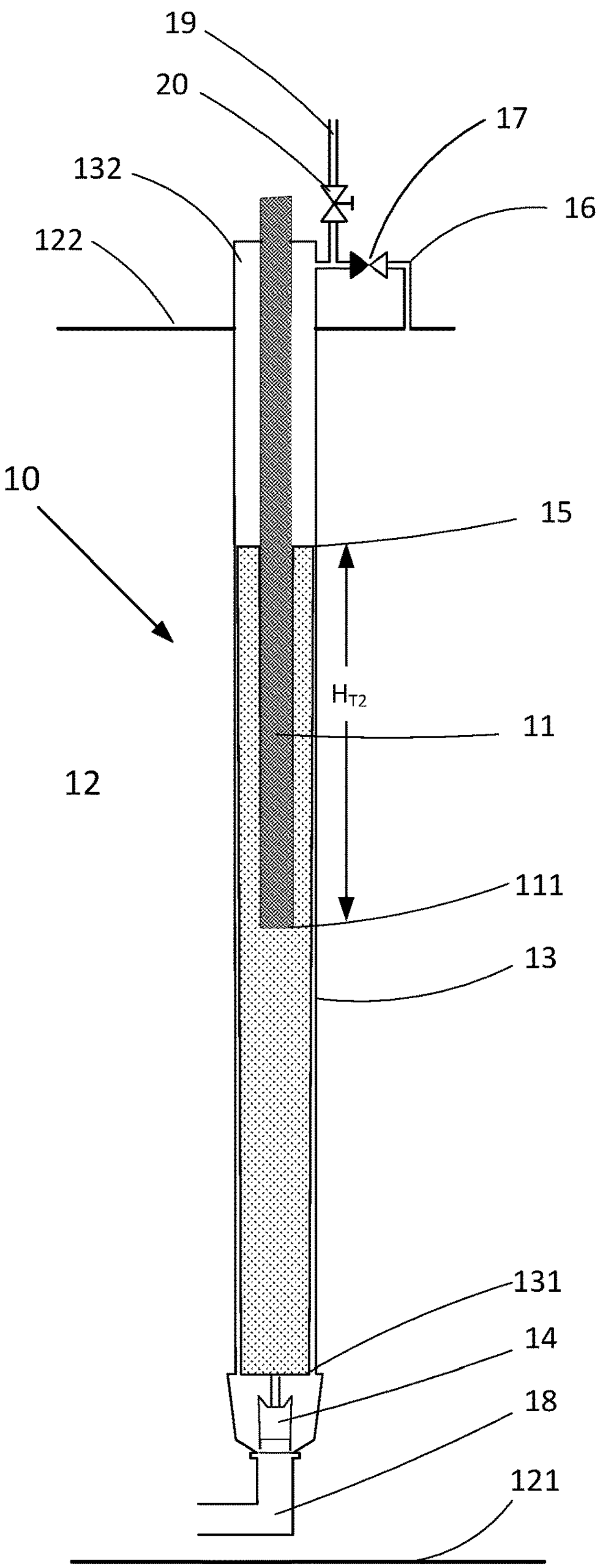
FIG. 2 is a side sectional view of an embodiment of a dropline according to the present disclosure \with a second fluid.

FIG. 2 is identical to FIG. 1 in most respects, one exception being that the liquid level 15 in the tube is lower, extending to a height $H_{T2}$ above the outlet end 111 of the oil supply conduit 11, indicating a liquid of a higher density, when the valve is of the kind opened by liquid pressure acting thereon. Another exception is a different embodiment of the pipe 16 and check valve 17 assembly, which in FIG. 2 furthermore comprises a conduit 19 provided with a closable valve 20. This arrangement allows the atmosphere inside dropline 13 to be replaced by an inert gas or breathable air for inspection or maintenance.

The main function of both alternatives is that loading of volatile liquid, typically oil, may be performed in a controlled and lenient manner already when the tank is empty or near empty. The liquid level 15 above the free end 111 of the oil supply conduit 11 ensures that the liquid is added under a slight pressure, while the valve 14 positioned low in the tank 12 ensures that there will be little or no splashing of liquid from the dropline 13 or conduit 18 that would cause excessive vaporization.

Figure 3:
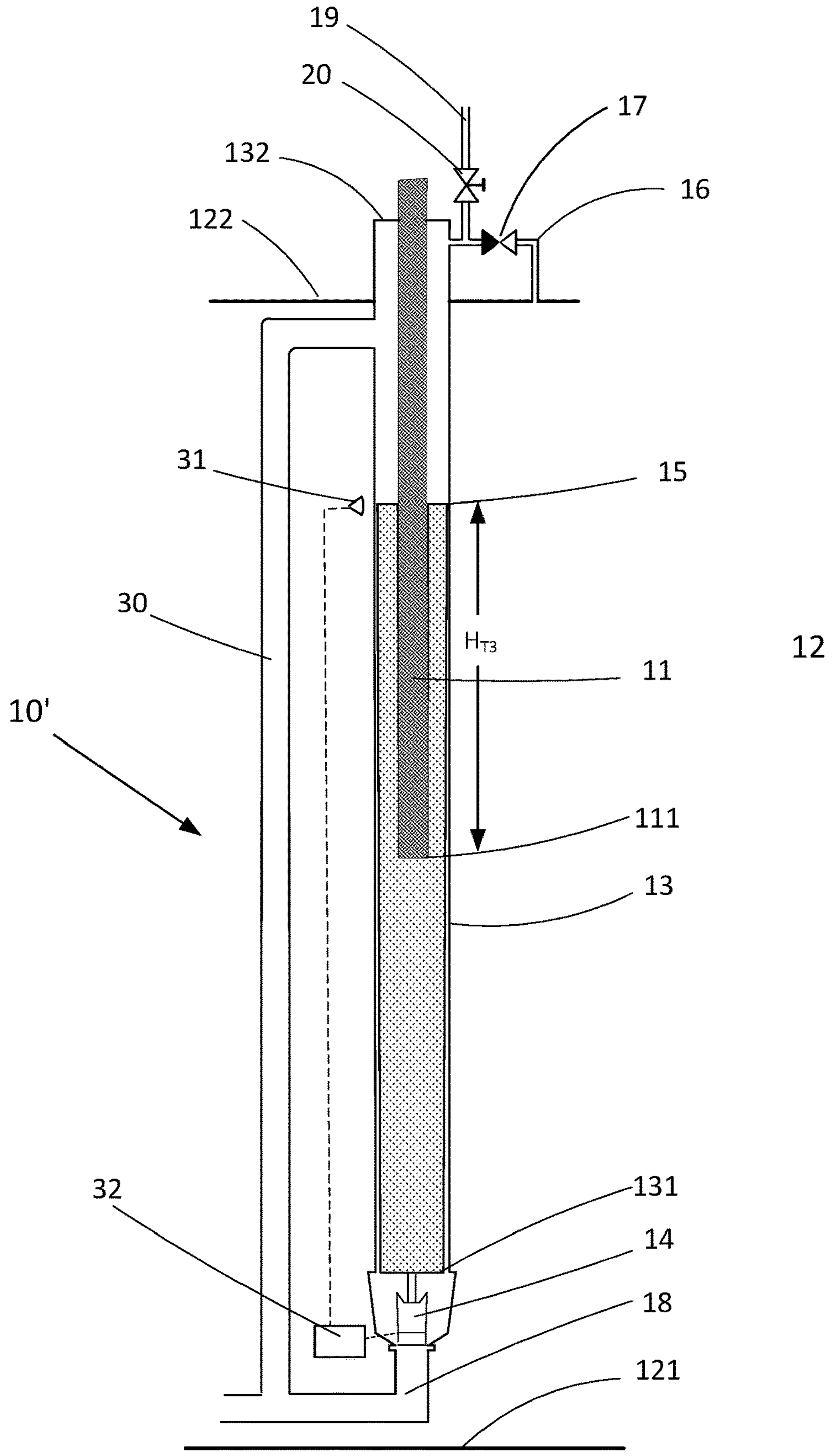
FIG. 3 is a side sectional view of an embodiment of a dropline according to the present disclosure with a bypass conduit and a sensor-based control system.

FIG. 3 shows an embodiment according to aspects of the present disclosure in which the oil filling assembly 10' is configured a little different. It is similar to FIGS. 1 and 2 in most respects, one exception being a sensor 31 that continuously monitors the liquid level in the dropline 13, and in combination with a control unit 32 causes the valve 14 to gradually open more as the liquid level within the tube rises, and vice versa. In that manner, the sensor-based system strives to hold the liquid level near constant, as with the case of a pressure determined valve. Another exception is a bypass conduit 30 with inlet from the upper part of dropline 13 just below the top wall 122 of tank 12, and outlet close to the bottom wall 121 of tank 12. In FIG. 3, the bypass conduit 30 is shown connected to the conduit 18. This is a possibility, and not a requirement. Should liquid level in the dropline 13 rise above the bypass conduit inlet for any reason, such as sensor failure, oil will simply flow through the bypass conduit 30 and into the cargo tank, or into the cargo distribution system, depending on piping arrangement. There are no restrictions, valves or monitoring of any kind in the bypass conduit, and as such there are no possibilities of failure. The bypass conduit 30 can be used with any embodiment of the present disclosure, but is typically more useful with a sensor-based system as described in FIG. 3, since this is expected to have a higher risk of failure than a gravity operated flow control device.

While the embodiments shown in FIGS. 1-3 show the valve 14 connected to a conduit 18, the valve 14 may in other embodiments constitute a terminal end of the dropline, not connected to a conduit or other piping.

Figure 4:
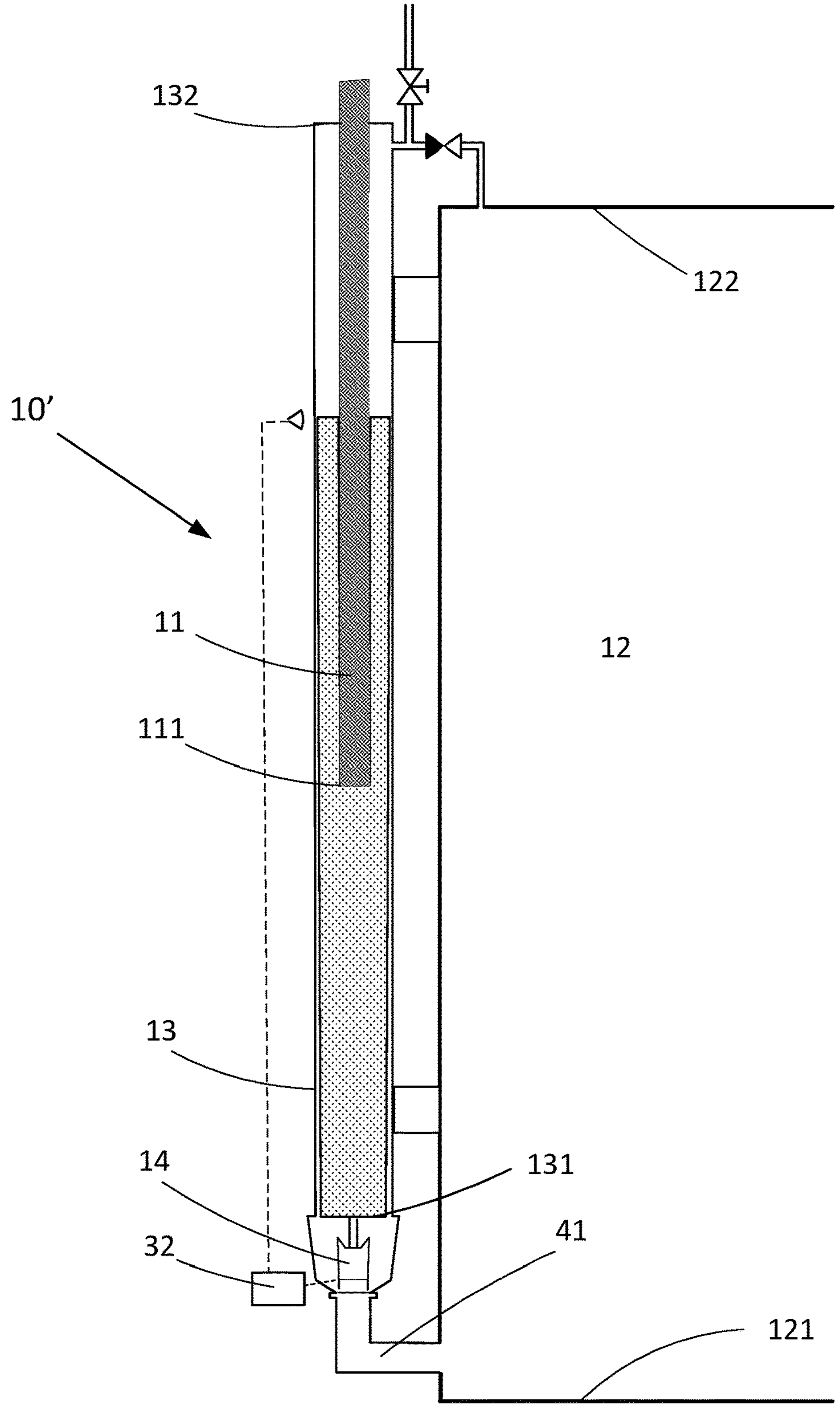
FIG. 4 is a side sectional view of a variant of the embodiment shown in FIG. 3.

FIG. 4 is a side sectional view of an embodiment according to aspects of the present disclosure in which the oil filling assembly 10' is located on the outside of a cargo tank. An outlet conduit 41 from the valve 14 is connected to the tank 12 proximate its bottom wall. While the oil filling assembly 10' of FIG. 4 is similar to the one of FIG. 3, the embodiments shown in FIGS. 1 and 2 may as well be arranged externally of the tank 12. The embodiment of FIG. 4 may be combined with an assembly 16, 17, 19, 20 as shown in FIGS. 2 and 3 and/or the bypass conduit 30 of FIG. 3.

FIG. 5 is a side sectional view of a series of tanks T1, T2, T3, provided with one oil filling assembly according to aspects of the present disclosure, and more particularly with the one shown in FIG. 3. It should be mentioned that dimensions of tanks T1-T3 in FIG. 5 in relation to dimensions of the oil filling assembly are out of scale. The particular feature of this design is a distribution pipe 51 between the tanks that allows distribution to a plurality of tanks from a common dropline. The distribution pipe 51 is typically provided with a valve 52 in each tank to determine which tank(s) to fill. A person skilled in the art understands that such a distribution pipe does not need to be connected to the outlet valve of the oil filling assembly. On the other hand, the same distribution pipe may be connected to more than one dropline/oil filling assembly. Still further, such a distribution pipe may be applied also in combination with one or more oil filling assemblies arranged outside the tanks as shown in FIG. 4.

While the advantages commented above are common for all disclosed embodiments of a liquid loading assembly, the specific features shown in the drawings illustrate exemplary embodiments of the disclosed liquid loading assembly.

The invention claimed is:

1. A liquid loading assembly for filling a ship-hold or tank (12) with a volatile liquid, the assembly comprising:

an oil supply conduit (11), fluidly connected to the tank (12), an outlet end (111) of said oil supply conduit (11) extending vertically within a dropline (13) wherein said dropline (13) extends from a lower dropline end (131) positioned below the outlet end (111) of the oil supply conduit to an upper dropline end (132) positioned above the outlet end (111) of the oil supply conduit, the lower dropline end (131) being at least partially closed by a valve (14), said valve opening gradually up to a maximum aperture in response to one of i) increased liquid pressure on the valve (14) by liquid in the dropline (13) above the valve (14) and ii) a sensed level of liquid within the dropline (13) above the valve.

2. The liquid loading assembly of claim 1, wherein the outlet end (111) of the oil supply conduit (11) is arranged at a vertical distance ($OSC_V$) of at least 4 meters above the lower dropline end (131).

3. The liquid loading assembly of claim 1, wherein the outlet of valve (14) at the bottom end of the dropline is localized in the range between 1 and 3 meters above a bottom wall (121) of the tank (12).

4. The liquid loading assembly of claim 1, wherein the valve (14) comprises a closure member opened by at least one of the following mechanisms, i) a pressure spring acting against the pressure of the liquid in the dropline (13), and ii) a level sensor in communication with a control system arranged to open the closure member to a degree sufficient to hold the liquid level at a mainly constant level in the dropline (13).

5. The liquid loading assembly of claim 4, wherein the mechanism involves a pressure spring connected to hold the closure member in a closed position when the dropline is empty and selected with a spring force unable to hold the closure member in a closed position when the dropline is filled with a volatile fluid of density higher than 0.6 kg/l to a level above the outlet end (111) of the oil supply conduit (11).

6. The liquid loading assembly of claim 1, wherein the valve (14) includes a closure member defining a limited open fluid passage in a closed position.

7. The liquid loading assembly of claim 1, wherein the maximum aperture and a closure force of the valve hold the fluid to be filled at a constant level within the dropline (13) during filling, said level depending upon the density of the fluid.

8. The liquid loading assembly of claim 1, comprising a bypass conduit (30) with an inlet from the dropline (13) adjacent to a top wall (122) of the tank (12), and an outlet proximate a bottom wall (121) of the tank (12), or into a common distribution pipe (51).

9. The liquid loading assembly of claim 1, in which an assembly (16) with a check valve (17) is arranged between the upper dropline end (132) of the dropline (13) and the tank (12) in order to allow vapour to flow from the tank to the dropline but not from the dropline to the tank.

10. The liquid loading assembly of claim 1, wherein the valve (14) is connected to a conduit (18) having an outlet end proximate a bottom (121) of the tank (12).

11. The liquid loading assembly of claim 10, wherein the conduit (18) is connected to a distribution pipe (51) extending through a plurality of tanks.

12. The liquid loading assembly of claim 1, wherein the outlet end (111) of the oil supply conduit (11) is arranged within the tank (12).

13. The liquid loading assembly of claim 1, wherein the outlet end (111) of the oil supply conduit (11) and the dropline (13) are arranged outside the tank while an outlet conduit (41) from the valve (14) is connected to the tank (12) proximate a bottom wall (121) thereof.

14. The liquid loading assembly of claim 1, wherein the upper end of the dropline (13) extends above a top wall (122) of the tank (12).

15. The liquid loading assembly of claim 1, wherein the dropline (13) has a height extending above the outlet end (111) of the oil supply conduit (11) allowing a height of liquid in the dropline (13) corresponding to a depth of the tank (12).

* * * * *